(12) United States Patent
Taniuchi et al.

(10) Patent No.: US 11,342,619 B2
(45) Date of Patent: May 24, 2022

(54) CELL STRUCTURE OF SOLID STATE BATTERY

(71) Applicant: Honda Motor Co., Ltd., Tokyo (JP)

(72) Inventors: Takuya Taniuchi, Saitama (JP); Masahiro Ohta, Saitama (JP); Yuriko Asahi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 41 days.

(21) Appl. No.: 16/726,253

(22) Filed: Dec. 24, 2019

(65) Prior Publication Data

US 2020/0203679 A1 Jun. 25, 2020

(30) Foreign Application Priority Data

Dec. 25, 2018 (JP) .............................. JP2018-241369

(51) Int. Cl.
*H01M 50/186* (2021.01)
*H01M 50/191* (2021.01)
(Continued)

(52) U.S. Cl.
CPC ....... *H01M 50/186* (2021.01); *H01M 10/058* (2013.01); *H01M 50/148* (2021.01); *H01M 50/183* (2021.01); *H01M 50/188* (2021.01); *H01M 50/191* (2021.01); *H01M 50/531* (2021.01); *H01M 50/543* (2021.01); *H01M 50/55* (2021.01); *H01M 50/553* (2021.01);
(Continued)

(58) Field of Classification Search
CPC combination set(s) only.
See application file for complete search history.

(56) References Cited

U.S. PATENT DOCUMENTS

| 2001/0004505 A1* | 6/2001 | Kim | ..................... H01M 50/172 |
| | | | 429/180 |
| 2011/0104528 A1* | 5/2011 | Byun | ................ H01M 50/3425 |
| | | | 429/61 |

(Continued)

FOREIGN PATENT DOCUMENTS

| JP | 2000106154 | 4/2000 |
| JP | 2004207089 | 7/2004 |

(Continued)

OTHER PUBLICATIONS

R. Kanno, "Secondary Batteries—Lithium Rechargeable Systems I Electrolytes: Solid Sulfide", pp. 129-137, Tokyo Institute of Technology, Yokohama, Japan; Elsevier B.V. (Year: 2009).*

(Continued)

*Primary Examiner* — Matthew T Martin
*Assistant Examiner* — Jessie L. Walls
(74) *Attorney, Agent, or Firm* — JCIPRNET

(57) ABSTRACT

The disclosure provides a cell structure of a solid state battery capable of uniformly holding a solid state battery cell in a battery case and a manufacturing method of a solid state battery. In a process of manufacturing a can cell of the solid state battery, a shock absorber is disposed in the battery case after the solid state battery cell is inserted into the battery case and before a can lid is welded. Then, the lid is provided to seal the case. At the time of sealing, the solid state cell and a terminal are fastened by using an engaging member, and the airtightness is improved.

8 Claims, 3 Drawing Sheets

(51) Int. Cl.
*H01M 50/531* (2021.01)
*H01M 50/543* (2021.01)
*H01M 50/183* (2021.01)
*H01M 50/188* (2021.01)
*H01M 50/567* (2021.01)
*H01M 50/55* (2021.01)
*H01M 10/058* (2010.01)
*H01M 50/148* (2021.01)
*H01M 50/553* (2021.01)
*H01M 50/15* (2021.01)

(52) U.S. Cl.
CPC .......... *H01M 50/567* (2021.01); *H01M 50/15* (2021.01)

(56) References Cited

U.S. PATENT DOCUMENTS

| | | | | |
|---|---|---|---|---|
| 2012/0009463 | A1* | 1/2012 | Lee | H01M 50/24 429/163 |
| 2012/0264007 | A1* | 10/2012 | Sasaki | H01M 50/172 429/182 |
| 2013/0101877 | A1* | 4/2013 | Kohno | H01M 50/10 429/94 |
| 2017/0256774 | A1* | 9/2017 | Iwasaki | H01M 50/183 |
| 2018/0159097 | A1* | 6/2018 | Fukushima | G03B 17/56 |
| 2018/0315966 | A1* | 11/2018 | Aldinger | H01M 50/172 |

FOREIGN PATENT DOCUMENTS

| | | | |
|---|---|---|---|
| JP | 2004303500 | 10/2004 | |
| JP | 2013222626 | 10/2013 | |
| JP | 2014017081 | 1/2014 | |
| JP | 2015018757 | 1/2015 | |
| WO | WO-2012014510 A1 * | 2/2012 | .......... H01M 50/169 |
| WO | 2012133711 | 10/2012 | |

OTHER PUBLICATIONS

Steve Melito, Elasto Proxy, "Bonded Gaskets for Sealing and Insulation", Sep. 9, 2018, <https://www.elastoproxy.com/bonded-gaskets-sealing-insulation/> (Year: 2018).*

Office Action of Japan Counterpart Application, with English translation thereof, dated Nov. 30, 2021, pp. 1-16.

Office Action of China Counterpart Application, with English translation thereof, dated Jan. 17, 2022, pp. 1-20.

* cited by examiner

CELL STRUCTURE OF SOLID STATE BATTERY

CROSS-REFERENCE TO RELATED APPLICATION

This application claims the priority benefit of Japan application no. 2018-241369, filed on Dec. 25, 2018. The entirety of the above-mentioned patent application is hereby incorporated by reference herein and made a part of this specification.

BACKGROUND

Technical Field

The disclosure relates to a cell structure of a solid state battery and a manufacturing method of a solid state battery. Specifically, the disclosure relates to a cell structure of a solid state battery capable of uniformly holding a solid state battery cell in a battery case and a manufacturing method of a solid state battery.

Description of Related Art

Conventionally, as secondary batteries having high energy density, lithium ion secondary batteries are extensively used. A lithium ion secondary battery has a structure in which a separator is present between a positive electrode and a negative electrode and liquid electrolyte (electrolytic solution) is filled therein.

Since the electrolytic solution of the lithium ion secondary battery is usually a flammable organic solvent, there have been cases in which heat-related safety has particularly become an issue. Therefore, a solid state battery using an inorganic solid state electrolyte instead of the organic liquid electrolyte has been proposed (see Patent Document 1: Japanese Laid-Open No. 2000-106154).

The solid state secondary battery includes a solid electrolyte layer as an electrolyte layer between the positive electrode and the negative electrode, and the configuration of a positive electrode, the solid electrolyte, and a negative electrode, through multiple times of stacking, form a battery cell. Compared with the battery using an electrolytic solution, the solid state battery formed of solid state electrolyte can resolve the heat issue as well as increase the capacity and/or the voltage through stacking, and can cope with the demand for being more compact.

Here, the conventional liquid lithium ion secondary battery filled with liquid electrolyte (electrolytic solution) is manufactured according to the following technique. In order to secure airtightness, after firstly connecting an electrode body and a can lid, the electrode body is inserted into a battery case, and a lid portion is welded to the case to seal the battery case. Subsequently, the electrolytic solution is injected through an injection port, and then aging is performed. Then, since the electrolytic solution is impregnated in the space of the electrode body and the electrode body itself expands through aging, a clearance present between the electrode and the battery case is filled, and a mechanism in which the electrode is held in the battery case is formed.

On the other hand, in the case of the solid state battery, since the solid electrolyte and the electrode are laminated and integrated to construct an electrode laminate as a solid state battery cell, the electrolytic solution is not required. Therefore, even though aging after the battery case is sealed, the solid state battery cell hardly expands, and the inserted clearance present between the solid state battery cell and the battery case remains as it is. As a result, a configuration in which the solid state battery cell is not held in the battery case is formed, and a durability issue, such as cracking during vibration, may arise. In addition, since a required load cannot be applied to the battery, the output may be decreased.

Regarding this, a technique of injecting a shock absorber from the injection port of the electrolytic solution to the clearance between the solid state battery cell and the battery case after the battery case is assembled is considered. Nevertheless, in this technique, it is anticipated that the shock absorber is not uniformly disposed in the battery case, and it is difficult to uniformly hold the solid state battery cell in the case. In addition, in the case where a curable resin is used as the shock absorber, there is a concern that the stress at the time of curing may be applied to the solid state battery cell and a crack may occur.

The disclosure provides a cell structure of a solid state battery capable of uniformly holding a solid state battery cell in a battery case and a manufacturing method of a solid state battery.

In a process of manufacturing a can cell of a solid state battery, if the shock absorber is disposed in the battery case after the solid state battery cell is inserted into the battery case and before the can lid is welded, and the lid is provided to seal the case, the shock absorber can be uniformly disposed in the battery case; and as a result, the solid state battery in which the solid state battery cell is uniformly held in the battery case can be formed.

However, in the case where the lid is provided to finish up the can cell after the shock absorber is inserted, an airtightness issue of the obtained can cell may arise. Therefore, the disclosure provides a method capable of connecting the solid state battery cell and a terminal in a highly airtight state after the battery case is sealed. Then, the solid state battery cell and the terminal are fastened by using an engaging member.

SUMMARY

An aspect of the disclosure provides a cell structure of a solid state battery including a positive electrode terminal and a negative electrode terminal. The cell structure includes a solid state battery cell and a battery case storing the solid state battery cell. The battery case includes a lid body and a storage body. The solid state battery cell includes a positive electrode power collecting member including a positive electrode terminal engaging member lower end part connected with a positive electrode collector tab and a negative electrode power collecting member including a negative electrode terminal engaging member lower end part connected with a negative electrode collector tab. The lid body includes a positive electrode terminal engaging member upper end part connected with the positive electrode terminal engaging member lower end part and a negative electrode terminal engaging member upper end part connected with the negative electrode terminal engaging member lower end part. By bonding the storage body storing the solid state battery cell and the lid body, the positive electrode terminal engaging member lower end part and the positive electrode terminal engaging member upper end part are bonded to form a positive electrode terminal engaging member, and the negative electrode terminal engaging member lower end part and the negative electrode terminal engaging member upper end part are bonded to form a negative electrode terminal engaging member. The positive electrode terminal is engaged with the positive electrode terminal engaging member, and the negative electrode terminal is engaged with the negative electrode terminal engaging member.

Another aspect of the disclosure provides a cell structure of a solid state battery including a positive electrode terminal and a negative electrode terminal. The cell structure includes a solid state battery cell and a battery case storing the solid state battery cell. The battery case includes a lid body and a storage body. The solid state battery cell includes a positive electrode power collecting member including the positive electrode terminal connected with a positive electrode collector tab and a negative electrode power collecting member including the negative electrode terminal connected with a negative electrode collector tab. The lid body includes a positive electrode terminal through hole through which the positive electrode terminal penetrates and a negative electrode terminal through hole through which the negative electrode terminal penetrates. The storage body storing the solid state battery cell and the lid body are bonded, so that the positive electrode terminal penetrates through the positive electrode terminal through hole and the negative electrode terminal penetrates through the negative electrode terminal through hole. Each of the positive electrode terminal through hole and the negative electrode terminal through hole is sealed by a gasket.

Another aspect of the disclosure provides a manufacturing method of a solid state battery including a positive electrode terminal and a negative electrode terminal. The solid state battery includes a solid state battery cell and a battery case storing the solid state battery cell. The battery case includes a lid body and a storage body. The manufacturing method includes: a solid state battery cell storing process for storing the solid state battery cell in the storage body of the battery case; a shock absorber disposing process for disposing a shock absorber in a gap between the solid state battery cell and the storage body of the battery case; and a battery case bonding process for bonding the storage body to the lid body.

DESCRIPTION OF THE EMBODIMENTS

Hereinafter, the embodiments of the disclosure will be described based on the drawings. However, the examples shown in the following only serve to illustrate the disclosure and the disclosure shall not be limited to the following.

<Manufacturing Method of Solid State Battery Cell>

The manufacturing method of the solid state battery cell of the disclosure is a manufacturing method of a solid state battery including a positive electrode terminal and a negative electrode terminal. The solid state battery includes a solid state battery cell and a battery case storing the solid state battery cell. The battery case includes a lid body and a storage body. The manufacturing method of the solid state battery cell includes a solid state battery cell storing process for storing the solid state battery cell in the storage body of the battery case, a shock absorber disposing process for disposing a shock absorber in a gap between the solid state battery cell and the storage body of the battery case, and a battery case bonding process for bonding the storage body and the lid body.

In addition, while the manufacturing method of the solid state battery of the disclosure is sufficient if the manufacturing method includes the solid state battery cell storing process, the shock absorber disposing process, and the battery case bonding process, the manufacturing method may also include other processes responsive to the aspect of the solid state battery to be manufactured.

Figure 1:
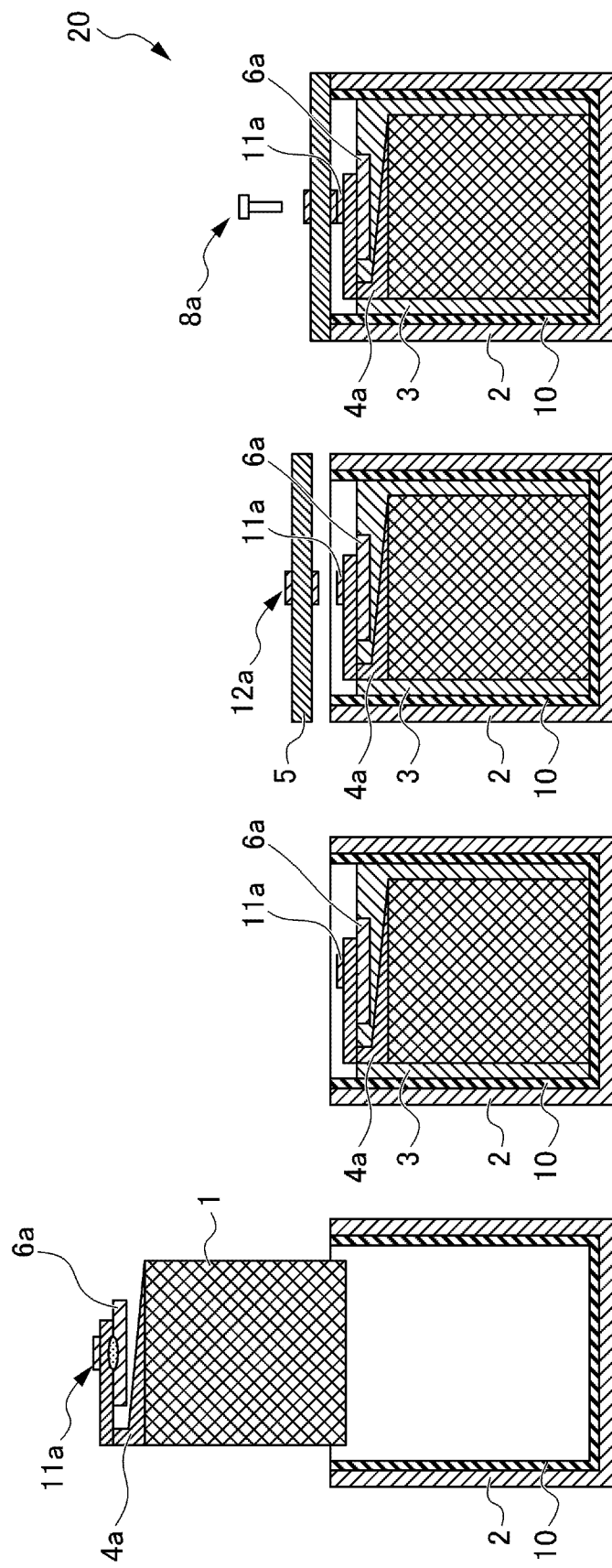
FIGS. 1(a) to 1(d) are views showing processes in a manufacturing method of a solid state battery of the disclosure as seen from a side surface of a positive electrode side.

The manufacturing method of the solid state battery of the disclosure will be described with reference to FIGS. 1(a) to (1d). FIGS. 1(a) to (1d) are views showing processes as seen from a side surface of the positive electrode side of the solid state battery.

[Solid State Battery Cell Storing Process]

The solid state battery cell storing process in the manufacturing method of the solid state battery cell in the disclosure is a process that stores the solid state battery cell in the storage body of the battery case. The storage method is not particularly limited, and any known method in the manufacture of solid state batteries can be applied.

FIG. 1(a) is a view showing the solid state battery cell storing process. In the solid state battery cell storing process, a solid state battery cell 1 formed in advance is stored in a storage body 2 of the battery case. An insulating sheet 10 is provided on an inner wall of the storage body 2 of the battery case shown in FIG. 1(a). In addition, a positive electrode tab 4a extends from the solid state battery cell 1 shown in FIG. 1(a), and a positive electrode power collecting member 6a is connected to the positive electrode tab 4a. Furthermore, the positive electrode power collecting member 6a includes a positive electrode terminal engaging member lower end part 11a.

[Shock Absorber Disposing Process]

The shock absorber disposing process in the manufacturing method of the solid state battery cell in the disclosure is a process that disposes the shock absorber in the gap (an insertion clearance space) between the solid state battery cell and the storage body of the battery case. The disposing process is not particularly limited. For example, there is a method in which a curable resin or the like is introduced to uniformly flow into the storage body and subsequently cured.

FIG. 1(b) is a view showing the shock absorber disposing process. In the shock absorber disposing process, a shock absorber 3 is disposed in the gap between the solid state battery cell 1 and the storage body 2 of the battery case. With the shock absorber 3, the insertion clearance present between the solid state battery cell 1 and the storage body 2 of the battery case is filled.

As the shock absorber applicable in the disclosure, examples include materials whose volume expands through a chemical reaction such as polymerization, such as foam urethane, thermosetting materials, such as a thermosetting resin, or gel-like materials such as silicone gel, etc. In the disclosure, in order to further improve the ability of holding an electrode laminate, it is necessary to firmly apply a constraint load to the electrode laminate. Therefore, among the materials, the thermosetting resin may be used.

[Battery Case Bonding Process]

The battery case bonding process in the manufacturing method of the solid state battery cell in the disclosure is a process that bonds the storage body in which the solid state battery cell and the shock absorber are disposed and the lid body. The bonding method is not particularly limited, and any known method in the manufacture of solid state batteries can be applied.

FIG. 1(c) is a view showing the battery case bonding process. In the battery case bonding process, the storage body 2 after the shock absorber 3 is disposed and the lid body 5 are bonded to seal the solid state battery cell 1. The lid body 5 of the battery case shown in FIG. 1(c) includes a positive electrode terminal engaging member upper end part 12a.

In the battery case bonding process shown in FIG. 1(c), by placing the lid body 5 on the storage body 2, the positive electrode terminal engaging member lower end part 11a included in the solid state battery cell 1 and the positive electrode terminal engaging member upper end part 12a included in the lid body 5 are bonded to form the positive electrode terminal engaging member.

[Other Process]

An example of arbitrary processes other than the solid state battery cell storing process, the shock absorber disposing process, and the battery case bonding process described above, which are the necessary processes in the manufacturing method of the solid state battery of the disclosure, includes a terminal fastening process.

{Terminal Fastening Process}

FIG. 1(d) is a view showing the terminal fastening process. In the terminal fastening process, a positive electrode terminal 8a is fastened to the positive electrode terminal engaging member that is formed. Accordingly, the solid state battery cell 1 is sealed in the battery case to obtain a final solid state battery 20.

In addition, in the manufacturing method of the solid state battery of the disclosure, in order to provide sufficient airtightness to the obtained solid state battery, the structure of the terminal engaging member to which the terminal is connected may be configured as a structure such as a threaded nut, the terminal is configured as a structure such as a bolt, and these structures are engaged to be fastened in the terminal fastening process. The cell structure of the solid state battery according to an exemplary embodiment will be described in the following.

The manufacturing method of the solid state battery of the disclosure is characterized in that, in a process of manufacturing a can cell of the solid state battery, the shock absorber is disposed in the battery case after the solid state battery cell is inserted into the battery case and before the lid of the battery case is welded in the shock absorber disposing process. Since the shock absorber is inserted before the lid of the battery case is set, the shock absorber can be uniformly disposed in the battery case. As a result, in the obtained solid state battery, the solid state battery cell can be uniformly held in the battery case.

<Cell Structure of Solid State Battery>

The cell structure of the solid state battery of the disclosure, which is in accordance with an aspect and can provide sufficient airtightness with the solid state battery obtained according to the manufacturing method of the solid state battery of the disclosure, will be described in the following. The cell structure of the solid state battery of the disclosure includes a positive electrode terminal, a negative electrode terminal, the solid state battery cell, as well as the battery case storing the solid state battery cell, and the battery case includes the lid body and the storage body.

First Embodiment

Figure 2:
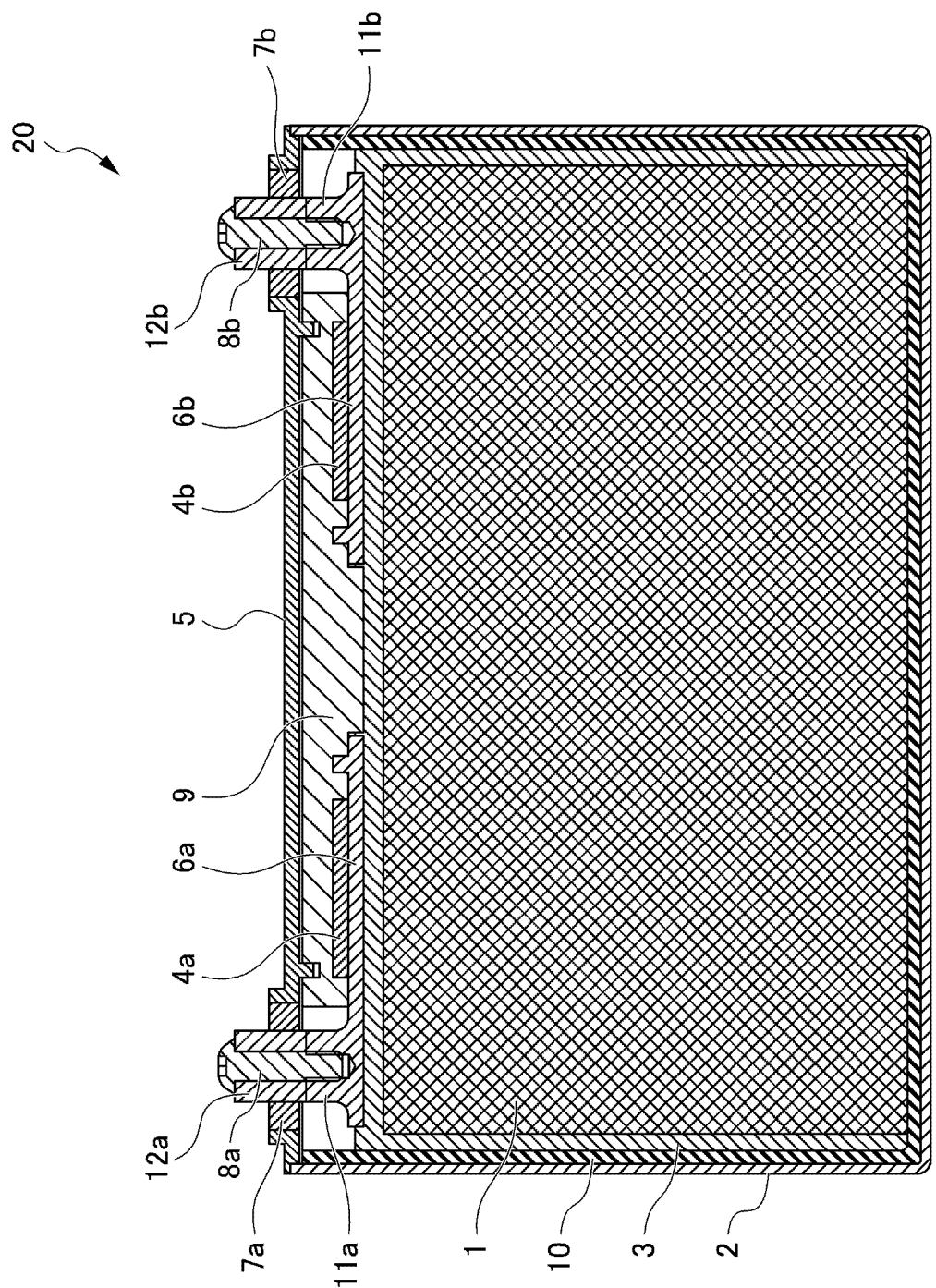
FIG. 2 is a view showing a solid state battery according to an embodiment of the disclosure.

FIG. 2 shows the cell structure of the solid state battery of the disclosure according to the first embodiment. In the cell structure of the solid state battery 20 shown in FIG. 2, the solid state battery cell 1 is stored in the storage body 2 of the battery case in which the insulating sheet 10 is installed, and the shock absorber 3 is disposed in the clearance between the solid state battery cell 1 and the storage body 2 of the battery case.

In addition, the positive electrode power collecting member 6a and a negative electrode power collecting member 6b are respectively connected to the positive electrode tab 4a and a negative electrode tab 4b extending from the solid state battery cell 1, and the positive electrode power collecting member 6a and the negative electrode power collecting member 6b include the positive electrode terminal engaging member lower end part 11a and a negative electrode terminal engaging member lower end part 11b. Moreover, a power collecting member fixing member 9 is placed on the positive electrode power collecting member 6a and the negative electrode power collecting member 6b of the solid state battery cell 1.

The lid body 5 of the battery case is placed on the power collecting member fixing member 9, and the solid state battery cell 1 is sealed. The lid body 5 of the battery case includes the positive electrode terminal engaging member upper end part 12a and a negative electrode terminal engaging member upper end part 12b, and the positive electrode terminal engaging member upper end part 12a and the negative electrode terminal engaging member upper end part 12b are respectively sealed by a positive electrode gasket 7a and a negative electrode gasket 7b.

Furthermore, in the cell structure of the solid state battery of the first embodiment, the positive electrode terminal engaging member lower end part 11a and the positive electrode terminal engaging member upper end part 12a are bonded to form the positive electrode terminal engaging member, the negative electrode terminal engaging member lower end part 11b and the negative electrode terminal engaging member upper end part 12b are bonded to form the negative electrode terminal engaging member. The positive electrode terminal 8a is engaged with the positive electrode terminal engaging member that is formed, and the negative electrode terminal 8b is engaged with the negative electrode terminal engaging member.

<Manufacturing Method of the Solid State Battery of the First Embodiment>

In the cell structure of the solid state battery of the first embodiment, a portion of the terminal engaging member is formed in the solid state battery cell, a portion of the terminal engaging member is formed in the lid body of the battery case, and by closing the lid of the battery case, a pair of terminal engaging members are formed. Then, after the battery case is closed with the lid body of the battery case, by engaging the terminals of the positive electrode and the negative electrode with the pair of terminal engaging members, the final solid state battery is obtained.

{Battery Case Bonding Process}

That is, in the battery case bonding process of the manufacturing method of the solid state battery of the disclosure according to the first embodiment, when the storage body and the lid body are bonded, the positive electrode terminal engaging member lower end part and the positive electrode terminal engaging member upper end part are bonded to form the positive electrode terminal engaging member, and the negative electrode terminal engaging member lower end part and the negative electrode terminal engaging member upper end part are bonded to form the negative electrode terminal engaging member.

{Terminal Fastening Process}

In addition, in the manufacturing method of the solid state battery of the disclosure according to the first embodiment, after the battery case bonding process, the terminal fastening process may be further included. In the terminal fastening process, the positive electrode terminal is engaged with the positive electrode terminal engaging member, the negative electrode terminal is engaged with the negative electrode terminal engaging member, and the positive electrode terminal and the negative electrode terminal are fastened to the solid state battery cell.

In addition, in the terminal fastening process, welding may be performed to a bonding portion between the positive electrode terminal engaging member and the positive electrode terminal and/or a bonding portion between the negative electrode terminal engaging member and the negative electrode terminal. By performing welding to the interface, the terminals can be reliably fixed, and the airtightness can be further improved.

(Surface Treatment)

In the cell structure of the solid state battery according to the first embodiment, a surface treatment may be performed to a bonding surface of the positive electrode terminal engaging member lower end part in the positive electrode power collecting member with respect to the positive electrode terminal engaging member upper end part and a bonding surface of the negative electrode terminal engaging member lower end part in the negative electrode power collecting member with respect to the negative electrode terminal engaging member upper end part.

In addition, in the lid body of the battery case, a surface treatment may be performed to a bonding surface of the positive electrode terminal engaging member upper end part with respect to the positive electrode terminal engaging member lower end part and a bonding surface of the negative electrode terminal engaging member upper end part with respect to the negative electrode terminal engaging member lower end part.

In the manufacturing method of the solid state battery of the disclosure according to the first embodiment, in the battery case bonding process, the terminal engaging member lower end part in the power collecting member and the terminal engaging member upper end part in the lid body of the battery are bonded to form the terminal engaging member. Therefore, by performing the surface treatment to the bonding surfaces, contact resistance can be reduced, and battery output can be improved.

The method for surface treatment is not particularly limited, but at least one may be selected from a group consisting of plating treatment such as gold plating, chromate treatment, and roughness reduction by blasting processing. Among the treatments, gold plating may be adopted because of lower contact resistance and higher corrosion resistance.

(Gasket)

In the cell structure of the solid state battery according to the first embodiment, the positive electrode terminal engaging member upper end part and/or the negative electrode terminal engaging member upper end part included in the lid body of the battery case may be sealed with a gasket. By sealing the terminal engaging member with the gasket, the insulating property of the terminal engaging member 12 and the lid body 5 can be secured, the sealing property of the solid state battery that is obtained can be improved, and a solid state battery having high airtightness can be realized.

The gasket sealing the terminal engaging member upper end part included in the lid body of the battery case is not particularly limited, but a gasket made of resin or glass is preferred. Among the gaskets, a glass gasket with glass hermetic seal may be used since such glass gasket is capable of not only providing airtightness but also heat resistance.

(Configuration of Terminal Engaging Member)

In the cell structure of the solid state battery according to the first embodiment, the terminal engaging member formed by bonding the terminal engaging member lower end part in the power collecting member and the terminal engaging member upper end part in the lid body of the battery may be a threaded nut and the terminal engaged with the terminal engaging member may be a bolt.

In addition, in the first embodiment, in the case where a nut is used as the terminal engaging member and a bolt is used as a terminal, while both the positive electrode and the negative electrode may have the configuration, it may also be that one of the positive electrode and the negative electrode has the configuration.

In the cell structure of the solid state battery according to the first embodiment, if the configuration for engaging the terminal and the solid state battery cell is a screw, the airtightness of the terminal and the solid state battery cell can be improved, and the terminal and the solid state battery cell can be easily fastened.

(Power Collecting Member Fixing Member)

In the cell structure of the solid state battery according to the first embodiment, the solid state battery cell may include a power collecting member fixing member for fixing the positive electrode power collecting member and the negative electrode power collecting member. With the power collecting member fixing member, the location of the power collecting member can be stabilized. Taking the above as an example, in the case where the configuration for engaging the terminal and the solid state battery cell is a screw, the power collecting member fixing member can suppress the rotation of the power collecting member when the screw is being fastened.

In the solid state battery 20 of the first embodiment as shown in FIG. 2, the power collecting member fixing member 9 is placed on the positive electrode and negative electrode power collecting members 6 of the solid state battery cell 1, and the lid body 5 of the battery case is placed on the power collecting member fixing member 9. In the aspect shown in FIG. 2, by forming convex portions in the power collecting members 6 and forming concave portions in the power collecting member fixing member 9 and fitting the convex portions of the power collecting members 6 with the concave portions of the power collecting member fixing member 9, the power collecting members 6 can be fixed more firmly.

Therefore, in the case where the cell structure of the solid state battery according to the first embodiment includes the power collecting member fixing member, structures capable of fitting may be provided at substantially the same locations of the power collecting member fixing member and the power collecting member, and by providing a fitting shape, the location of the power collecting member can be further stabilized. As a result, the decrease in the durability and output of the battery can be suppressed.

Second Embodiment

Figures 3A, 3B:
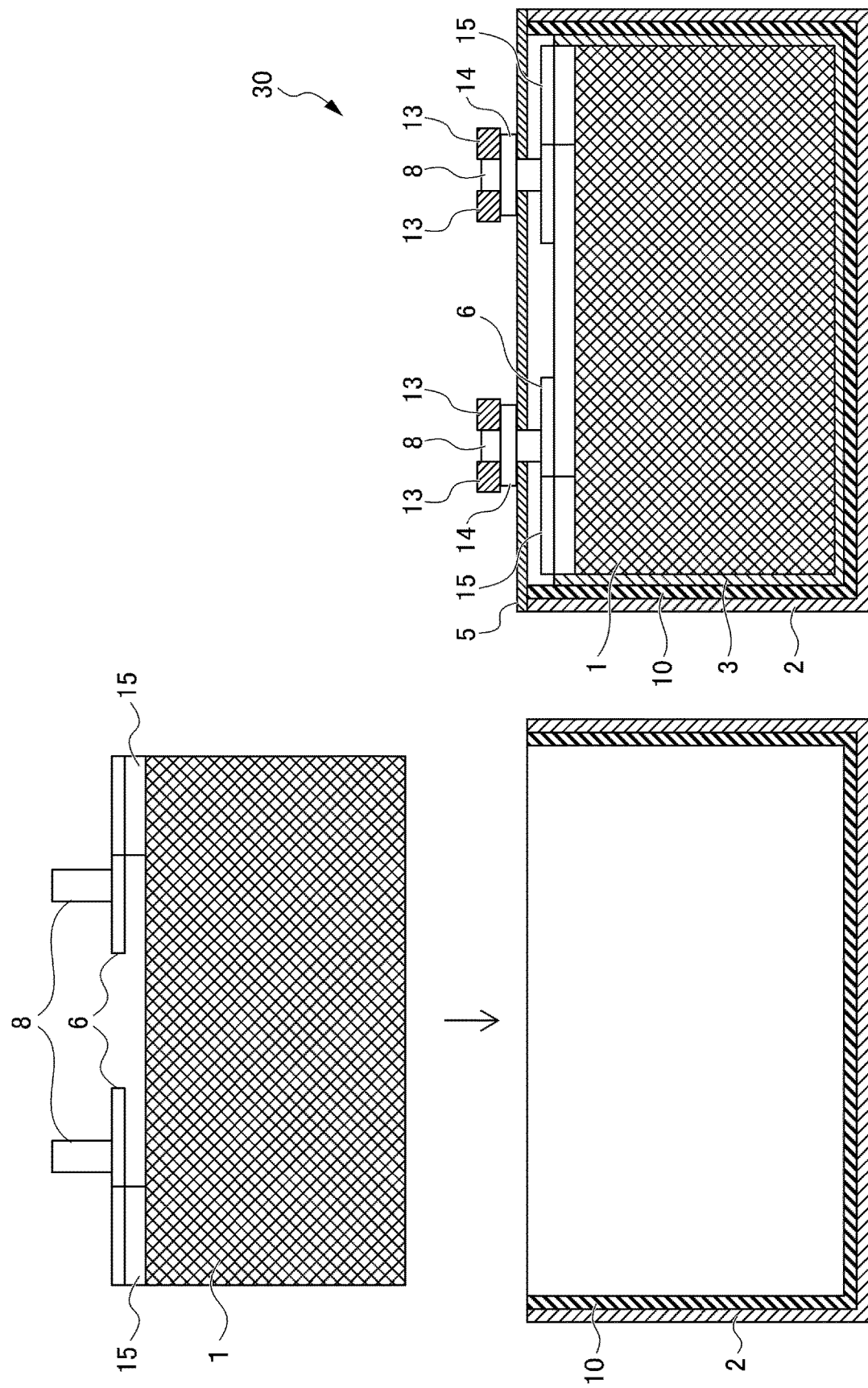
FIGS. 3(a) and 3(b) are views showing a solid state battery according to an embodiment of the disclosure.

The cell structure of the solid state battery of the disclosure according to the second embodiment will be described with reference to FIGS. 3(a) and 3(b). FIG. 3(a) is a view showing the solid state battery cell storing process in which the solid state battery cell 1 is stored in the storage body 2 of the battery case in which the insulating sheet 10 is installed. FIG. 3(*b*) is a view showing the cell structure of a solid state battery 30 according to the second embodiment.

In the cell structure of the solid state battery 30 shown in FIG. 3(*b*), the solid state battery cell 1 is stored in the storage body 2 of the battery case in which the insulating sheet 10 is installed, and the shock absorber 3 is disposed in the clearance between the solid state battery cell 1 and the storage body 2 of the battery case.

In addition, tabs 15 of the positive electrode and the negative electrode extending from the solid state battery cell 1 are respectively connected with the power collecting members 6 of the positive electrode and the negative electrode, and the power collecting members 6 include the terminals 8 of the positive electrode and the negative electrode, respectively. The storage body 2 of the battery case and the lid body 5 are bonded to seal the solid state battery cell 1 in the battery case.

In the cell structure of the solid state battery according to the second embodiment, the lid body 5 of the battery case includes a positive electrode terminal through hole through which the positive electrode terminal penetrates and a negative electrode terminal through hole through which the negative electrode terminal penetrates. In addition, the storage body 2 and the lid body 5 are bonded in a state where the terminals 8 of the positive electrode and the negative electrode respectively disposed in the power collecting members 6 respectively penetrate through the terminal through holes of the positive electrode and the negative electrode.

Moreover, in the cell structure of the solid state battery of the second embodiment, the through holes through which the terminals 8 of the positive electrode and the negative electrode penetrate are respectively sealed by the gaskets 14 from the exterior side of the solid state battery, and the terminals 8 are fastened, with the gaskets 14 being sandwiched, by the nuts 13.

<Manufacturing Method of the Solid State Battery of the Second Embodiment>

In the cell structure of the solid state battery of the second embodiment, in the solid state battery cell, the positive electrode terminal and the negative electrode terminal are formed, the through holes for the positive electrode terminal and the negative electrode terminal to penetrate through are formed on the lid body of the battery case, and by closing the lid of the battery case, the terminals penetrate through the through holes. Then, after the battery case is closed with the lid body of the battery case, each of the through holes through which the terminals penetrate is sealed by the gasket from the exterior side of the case.

{Battery Case Bonding Process}

That is, in the battery case bonding process of the manufacturing method of the solid state battery of the disclosure according to the second embodiment, the storage body and the lid body are bonded, so that the positive electrode terminal penetrates through the positive electrode terminal through hole and the negative electrode terminal penetrates through the negative electrode terminal through hole.

{Through Hole Sealing Process}

In addition, in the manufacturing method of the solid state battery of the disclosure according to the second embodiment, a through hole sealing process after the battery case bonding process. In the through hole sealing process, each of the positive electrode terminal through hole through which the positive electrode terminal penetrates and the negative electrode terminal through hole through which the negative electrode terminal penetrates is sealed by the gasket. By sealing with the gasket, the terminal can be reliably fixed, and the airtightness can be further improved.

(Gasket)

In the cell structure of the solid state battery according to the second embodiment, the gasket used for sealing the through hole is not particularly limited, but a gasket made of resin may be adopted. By using the resin-made gasket, the insulating property of the terminal and the lid body is secured, and the airtightness is improved.

As the material of the gasket used in the second embodiment, examples include silicone rubber, rubber such as fluorine-based rubber, and resin such as polyethylene terephthalate (PET), polypropylene (PP), polyethylene (PE), polycarbonate (PC), polyimide (PI), Teflon (registered trademark) (PTFE), etc. Among the materials, fluorine-based rubber may be adopted for having high heat resistance temperature, chemical resistance, high sealing property.

(Terminal Configuration)

{Bolt}

In the cell structure of the solid state battery according to the second embodiment, the terminal formed in the power collecting member of the solid state battery cell may be a threaded bolt. By using a bolt as the terminal, the terminal can be fastened by being engaged with the nut, with the gasket being sandwiched, from the exterior side of the lid body.

In addition, in the first embodiment, in the case where a bolt is used as the terminal, while both the positive electrode and the negative electrode may have the configuration, it may also be that one of the positive electrode and the negative electrode has the configuration.

In the cell structure of the solid state battery according to the second embodiment, by using a bolt as the terminal and engaging the terminal with the nut using the thread, with the gasket being sandwiched, the terminal can be reliably fixed, and the airtightness can be further improved.

{Rivet}

In the cell structure of the solid state battery according to the second embodiment, a rivet can also be used as the terminal formed in the power collecting member of the solid state battery cell. By using a rivet, the number of parts can be decreased.

<Other Configuration>

In the cell structure of the solid state battery and the manufacturing method of the solid state battery of the disclosure, there is no particular limitation regarding configurations other than those described above. Materials, methods, etc., known in the field of solid state batteries can be applied.

An aspect of the disclosure provides a cell structure of a solid state battery including a positive electrode terminal and a negative electrode terminal. The cell structure includes a solid state battery cell and a battery case storing the solid state battery cell. The battery case includes a lid body and a storage body. The solid state battery cell includes a positive electrode power collecting member including a positive electrode terminal engaging member lower end part connected with a positive electrode collector tab and a negative electrode power collecting member including a negative electrode terminal engaging member lower end part connected with a negative electrode collector tab. The lid body includes a positive electrode terminal engaging member upper end part connected with the positive electrode terminal engaging member lower end part and a negative electrode terminal engaging member upper end part connected with the negative electrode terminal engaging member lower end part. By bonding the storage body storing the solid state battery cell and the lid body, the positive electrode terminal engaging member lower end part and the positive electrode terminal engaging member upper end part are bonded to form a positive electrode terminal engaging member, and the negative electrode terminal engaging member lower end part and the negative electrode terminal engaging member upper end part are bonded to form a negative electrode terminal engaging member. The positive electrode terminal is engaged with the positive electrode terminal engaging member, and the negative electrode terminal is engaged with the negative electrode terminal engaging member.

According to an embodiment of the disclosure, a surface treatment is performed to a bonding surface of the positive electrode terminal engaging member lower end part with respect to the positive electrode terminal engaging member upper end part and a bonding surface of the negative electrode terminal engaging member lower end part with respect to the negative electrode terminal engaging member upper end part.

According to an embodiment of the disclosure, a surface treatment is performed to a bonding surface of the positive electrode terminal engaging member upper end part with respect to the positive electrode terminal engaging member lower end part and a bonding surface of the negative electrode terminal engaging member upper end part with respect to the negative electrode terminal engaging member lower end part.

According to an embodiment of the disclosure, the surface treatment is at least one selected from a group consisting of plating, chromate treatment, and blasting processing.

According to an embodiment of the disclosure, in the lid body, the positive electrode terminal engaging member upper end part and/or the negative electrode terminal engaging member upper end part is sealed by a gasket.

According to an embodiment of the disclosure, the gasket is made of resin or glass.

According to an embodiment of the disclosure, the positive electrode terminal engaging member is a nut, and the positive electrode terminal is a bolt.

According to an embodiment of the disclosure, the negative electrode terminal engaging member is a nut, and the negative electrode terminal is a bolt.

According to an embodiment of the disclosure, the solid state battery cell includes a power collecting member fixing member for fixing the positive electrode power collecting member and the negative electrode power collecting member.

Another aspect of the disclosure provides a cell structure of a solid state battery including a positive electrode terminal and a negative electrode terminal. The cell structure includes a solid state battery cell and a battery case storing the solid state battery cell. The battery case includes a lid body and a storage body. The solid state battery cell includes a positive electrode power collecting member including the positive electrode terminal connected with a positive electrode collector tab and a negative electrode power collecting member including the negative electrode terminal connected with a negative electrode collector tab. The lid body includes a positive electrode terminal through hole through which the positive electrode terminal penetrates and a negative electrode terminal through hole through which the negative electrode terminal penetrates. The storage body storing the solid state battery cell and the lid body are bonded, so that the positive electrode terminal penetrates through the positive electrode terminal through hole and the negative electrode terminal penetrates through the negative electrode terminal through hole. Each of the positive electrode terminal through hole and the negative electrode terminal through hole is sealed by a gasket.

According to an embodiment of the disclosure, the gasket is made of resin.

According to an embodiment of the disclosure, the positive electrode terminal is a bolt and is engaged, with the gasket being sandwiched, with a nut from an exterior side of the lid body.

According to an embodiment of the disclosure, the negative electrode terminal is a bolt and is engaged, with the gasket being sandwiched, with a nut from an exterior side of the lid body.

According to an embodiment of the disclosure, the positive electrode terminal and/or the negative electrode terminal is a rivet.

Another aspect of the disclosure provides a manufacturing method of a solid state battery including a positive electrode terminal and a negative electrode terminal. The solid state battery includes a solid state battery cell and a battery case storing the solid state battery cell. The battery case includes a lid body and a storage body. The manufacturing method includes: a solid state battery cell storing process for storing the solid state battery cell in the storage body of the battery case; a shock absorber disposing process for disposing a shock absorber in a gap between the solid state battery cell and the storage body of the battery case; and a battery case bonding process for bonding the storage body to the lid body.

According to an embodiment of the disclosure, in the manufacturing method of the solid state battery, the solid state battery cell includes a positive electrode power collecting member including a positive electrode terminal engaging member lower end part connected with a positive electrode collector tab and a negative electrode power collecting member including a negative electrode terminal engaging member lower end part connected with a negative electrode collector tab; the lid body includes a positive electrode terminal engaging member upper end part connected with the positive electrode terminal engaging member lower end part and a negative electrode terminal engaging member upper end part connected with the negative electrode terminal engaging member lower end part; in the battery case bonding process, the positive electrode terminal engaging member lower end part and the positive electrode terminal engaging member upper end part are bonded to form a positive electrode terminal engaging member, and the negative electrode terminal engaging member lower end part and the negative electrode terminal engaging member upper end part are bonded to form a negative electrode terminal engaging member; and the manufacturing method further includes a terminal fastening process for engaging the positive electrode terminal with the positive electrode terminal engaging member and engaging the negative electrode terminal with the negative electrode terminal engaging member to fasten the positive electrode terminal and the negative electrode terminal to the solid state battery cell.

According to an embodiment of the disclosure, in the manufacturing method of the solid state battery, a surface treatment is performed to a bonding surface of the positive electrode terminal engaging member lower end part with respect to the positive electrode terminal engaging member upper end part and a bonding surface of the negative electrode terminal engaging member lower end part with respect to the negative electrode terminal engaging member upper end part.

According to an embodiment of the disclosure, in the manufacturing method of the solid state battery, a surface treatment is performed to a bonding surface of the positive electrode terminal engaging member upper end part with respect to the positive electrode terminal engaging member lower end part and a bonding surface of the negative electrode terminal engaging member upper end part with respect to the negative electrode terminal engaging member lower end part.

According to an embodiment of the disclosure, in the manufacturing method of the solid state battery, the surface treatment is at least one selected from a group consisting of plating, chromate treatment, and blasting processing.

According to an embodiment of the disclosure, in the manufacturing method of the solid state battery, in the lid body, the positive electrode terminal engaging member upper end part and/or the negative electrode terminal engaging member upper end part is sealed by a gasket.

According to an embodiment of the disclosure, in the manufacturing method of the solid state battery, the gasket is made of resin or glass.

According to an embodiment of the disclosure, in the manufacturing method of the solid state battery, the positive electrode terminal engaging member is a nut, and the positive electrode terminal is a bolt.

According to an embodiment of the disclosure, in the manufacturing method of the solid state battery, the negative electrode terminal engaging member is a nut, and the negative electrode terminal is a bolt.

According to an embodiment of the disclosure, in the manufacturing method of the solid state battery, the solid state battery cell includes a power collecting member fixing member for fixing the positive electrode power collecting member and the negative electrode power collecting member.

According to an embodiment of the disclosure, in the manufacturing method of the solid state battery, the solid state battery cell includes a positive electrode power collecting member including the positive electrode terminal connected with a positive electrode collector tab and a negative electrode power collecting member including the negative electrode terminal connected with a negative electrode collector tab; the lid body includes a positive electrode terminal through hole through which the positive electrode terminal penetrates and a negative electrode terminal through hole through which the negative electrode terminal penetrates; in the battery case bonding process, the storage body and the lid body are bonded, so that the positive electrode terminal penetrates through the positive electrode terminal through hole, and the negative electrode terminal penetrates through the negative electrode terminal through hole; and the manufacturing method further includes a through hole sealing process for sealing each of the positive electrode terminal through hole and the negative electrode terminal through hole with a gasket.

According to an embodiment of the disclosure, in the manufacturing method of the solid state battery further including the through hole sealing process, the gasket is made of resin.

According to an embodiment of the disclosure, the manufacturing method of the solid state battery further including the through hole sealing process further includes a terminal fastening process in which the positive electrode terminal and the negative electrode terminal are bolts and are engaged, with the gasket being sandwiched, with nuts from an exterior side of the lid body, and the positive electrode terminal and the negative electrode terminal are fastened to the solid state battery cell.

According to an embodiment of the disclosure, the manufacturing method of the solid state battery further including the through hole sealing process, the positive electrode terminal and/or the negative electrode terminal is a rivet.

According to the cell structure of the solid state battery and the manufacturing method of the solid state battery of the disclosure, since the solid state battery cell can be uniformly held in the battery case, a solid state battery having durability and a suppressed decrease in output can be realized.

What is claimed is:

1. A cell structure of a solid state battery comprising a positive electrode terminal and a negative electrode terminal, the cell structure comprising:

a solid state battery cell and a battery case storing the solid state battery cell, wherein the battery case comprises a lid body and a storage body, the solid state battery cell comprises a positive electrode power collecting member comprising a positive electrode terminal engaging member lower end part connected with a positive electrode collector tab and a negative electrode power collecting member comprising a negative electrode terminal engaging member lower end part connected with a negative electrode collector tab, the lid body comprises a positive electrode terminal engaging member upper end part connected with the positive electrode terminal engaging member lower end part and a negative electrode terminal engaging member upper end part connected with the negative electrode terminal engaging member lower end part, by bonding the storage body storing the solid state battery cell and the lid body, the positive electrode terminal engaging member lower end part and the positive electrode terminal engaging member upper end part are bonded to form a positive electrode terminal engaging member, and the negative electrode terminal engaging member lower end part and the negative electrode terminal engaging member upper end part are bonded to form a negative electrode terminal engaging member, the positive electrode terminal is engaged with the positive electrode terminal engaging member by inserting the positive electrode terminal into the positive electrode terminal engaging member, and the negative electrode terminal is engaged with the negative electrode terminal engaging member by inserting the negative electrode terminal into the negative electrode terminal engaging member, and in the lid body, the positive electrode terminal engaging member upper end part and/or the negative electrode terminal engaging member upper end part is sealed by a gasket.

2. The cell structure of the solid state battery as claimed in claim 1, wherein a surface treatment is performed to a bonding surface of the positive electrode terminal engaging member lower end part with respect to the positive electrode terminal engaging member upper end part and a bonding surface of the negative electrode terminal engaging member lower end part with respect to the negative electrode terminal engaging member upper end part.

3. The cell structure of the solid state battery as claimed in claim 2, wherein the surface treatment is at least one selected from a group consisting of plating, chromate treatment, and blasting processing.

4. The cell structure of the solid state battery as claimed in claim 1, wherein a surface treatment is performed to a bonding surface of the positive electrode terminal engaging member upper end part with respect to the positive electrode terminal engaging member lower end part and a bonding surface of the negative electrode terminal engaging member upper end part with respect to the negative electrode terminal engaging member lower end part.

5. The cell structure of the solid state battery as claimed in claim 1, wherein the gasket is made of resin or glass.

6. The cell structure of the solid state battery as claimed in claim 1, wherein the positive electrode terminal is a bolt.

7. The cell structure of the solid state battery as claimed in claim 1, wherein the negative electrode terminal is a bolt.

8. The cell structure of the solid state battery as claimed in claim 1, wherein the solid state battery cell comprises a power collecting member fixing member for fixing the positive electrode power collecting member and the negative electrode power collecting member.

* * * * *